June 28, 1932. A. E. STOKER 1,864,870
SELECTIVE RATIO CLUTCH
Filed Oct. 5, 1929 2 Sheets-Sheet 1

INVENTOR.
ALBERT E. STOKER
BY Charles E. Wiener
ATTORNEY.

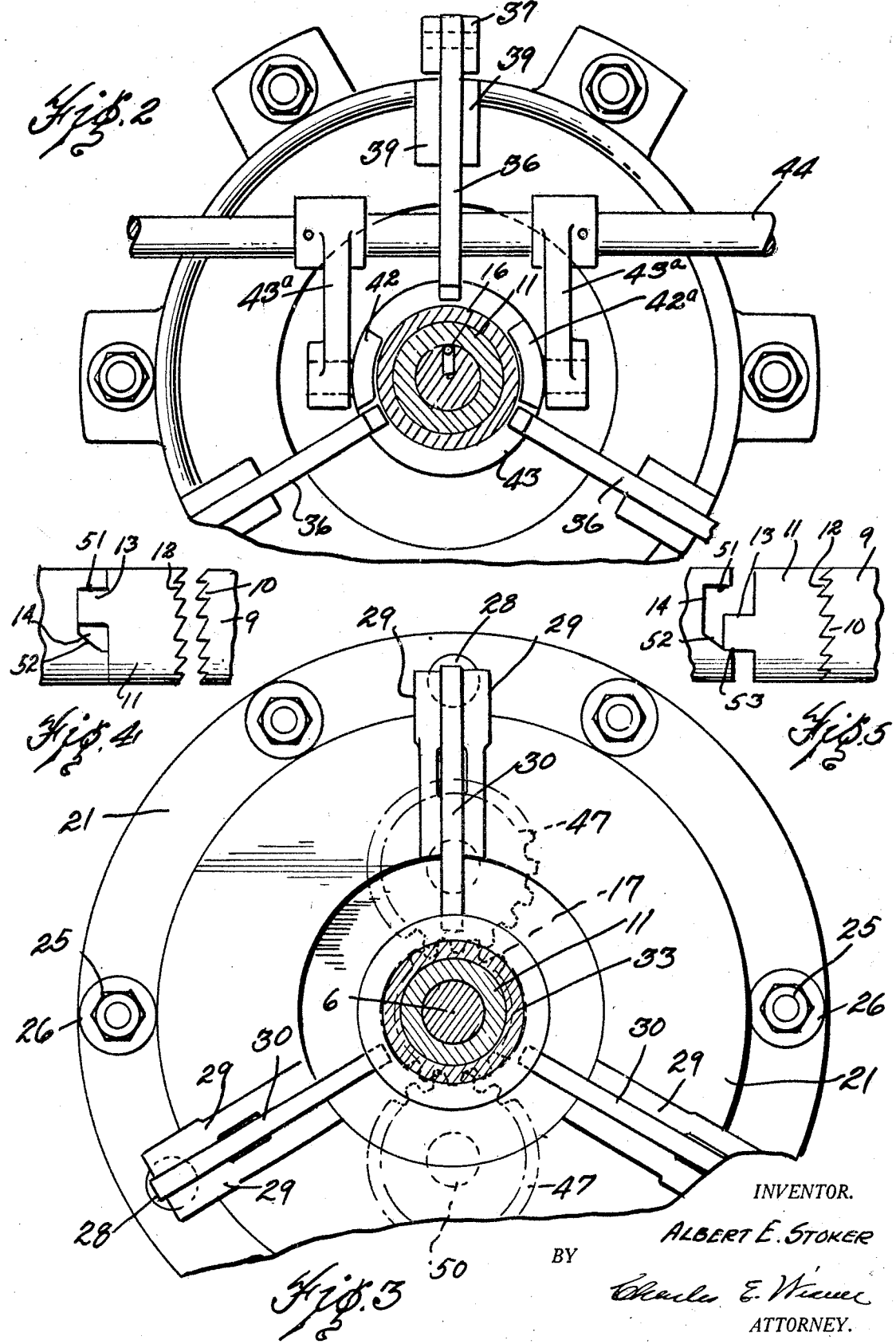

Patented June 28, 1932

1,864,870

UNITED STATES PATENT OFFICE

ALBERT E. STOKER, OF DETROIT, MICHIGAN

SELECTIVE RATIO CLUTCH

Application filed October 5, 1929. Serial No. 397,489.

This invention relates to selective ratio clutches and the object of the invention is to provide a clutch in which two different power transmissions may be attained by movement of the clutch pedal.

Another object of the invention is to provide a selective ratio clutch in which a direct drive is attained from the engine to the propeller shaft when the clutch is in complete engagement and by depressing the clutch pedal to an intermediate position a lower gear ratio is attained between the engine and propeller shaft.

A further object of the invention is to provide a selective ratio clutch in which an epicyclic gear train is utilized so that there is no possibility of the gears clashing upon different clutch operations.

A further object of the invention is to provide a clutch mechanism that will permit the full operation of the automobile in a forward direction by operation of the clutch pedal without the necessity of shifting gears when starting or any time when it is desired to reduce the ratio of power transmission while driving.

Another object of the invention is to provide an arrangement whereby the releasing of the clutches is accomplished by movement of the foot pedal in one direction only, the first movement actuating the lower speed ratio and the complete movement disconnecting the entire selective ratio clutch from the drive shaft.

These objects and the several novel features of the invention are hereinafter more fully described and claimed and the preferred form of construction by which these objects are attained is shown in the accompanying drawings in which—

Fig. 2 is a section taken on line 2—2 of Fig. 1.

Fig. 3 is a section taken on line 3—3 of Fig. 1.

Fig. 4 is an elevation of the toothed sleeve in the position shown in Fig. 1.

Fig. 5 is an elevation of the toothed sleeve in another position.

Figure 1:
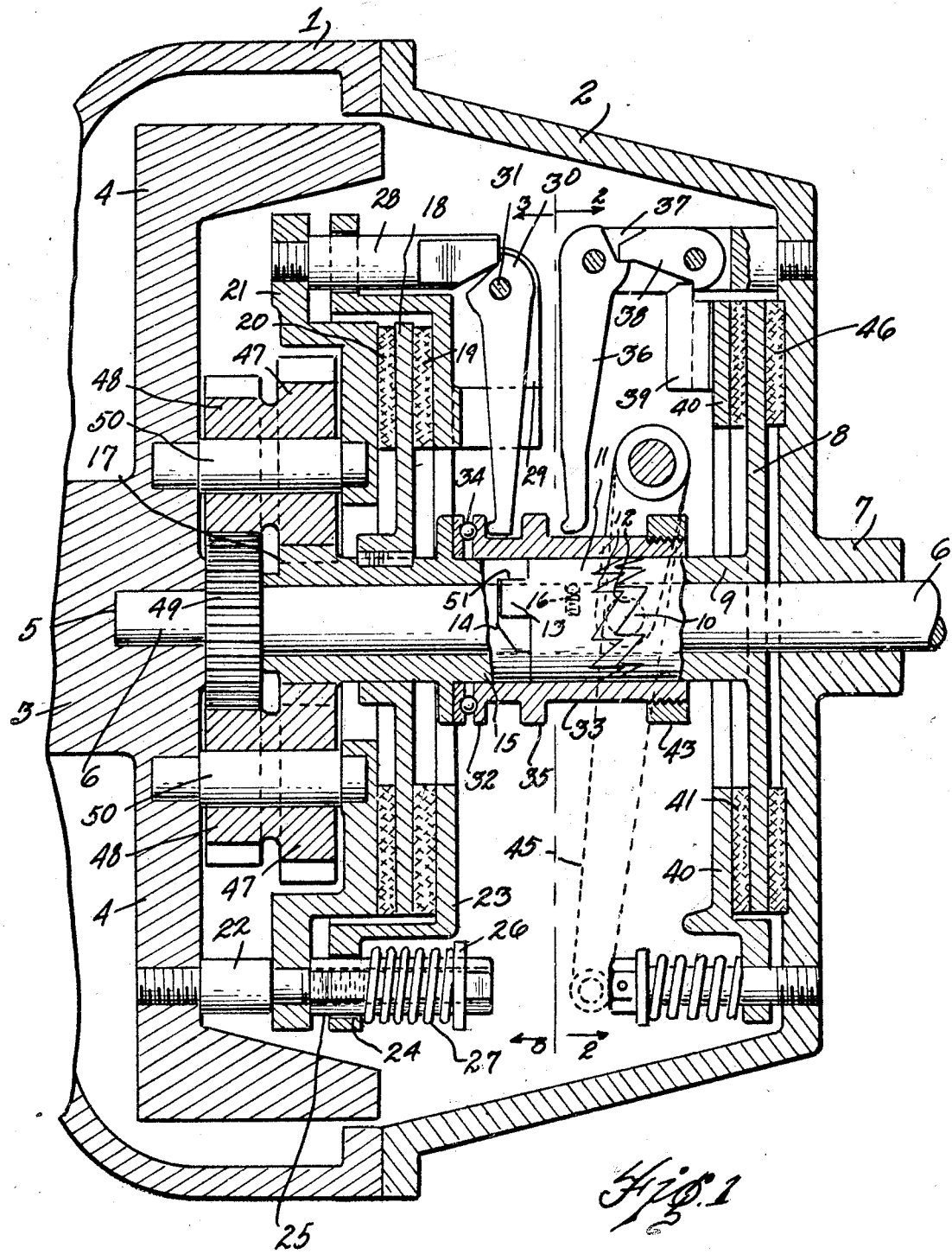
Fig. 1 is a section through a selective ratio clutch embodying my invention.

As shown in Fig. 1 the device comprises a housing 1 to which a clutch housing 2 is secured. The engine shaft 3 is provided with a flywheel 4 and this flywheel is provided with a recess 5 which forms a bearing for the end of the shaft 6. The opposite end of the shaft 6 is rotatably mounted in a bearing 7 formed in the clutch housing 2. As will be noted from Fig. 1 a clutch disc 8 is provided having a hub 9 which is free to rotate on the shaft 6. The end of this hub 8 is provided with claw teeth 10 shown in Figs. 1, 4 and 5. A toothed sleeve 11 is rotatably mounted on the shaft 6 and is provided with claw teeth 12 adapted for engagement with the claw teeth 10 of the disc hub 9. At the opposite end this toothed sleeve 11 is provided with a pair of diametrically opposite tongues 13 extending into notches 14 formed in the end of the geared sleeve 15. In order to place a slight friction on the toothed sleeve 11 a spring pressed ball 16, shown in Figs. 1 and 2, is mounted in a recess provided therefor in the shaft 6.

The end of the geared sleeve opposite the notches 14 is toothed to provide a gear 17 as shown in Fig. 1. Keyed to the geared sleeve 15 is a clutch disc 18 riding between two friction faces 19 and 20. The friction face 20 is secured to the base plate 21 which is secured to the flywheel 4 by a series of six studs one of which is shown at 22 in Fig. 1. The other friction face 19 is secured to a friction plate 23 which is provided with a series of six apertures 24 in its outer flange through each of which an elongated nut 25 is inserted and threaded onto the respective stud 22. Each nut 25 is provided with a collar 26 and a spring 27 is positioned about each nut between the collar 26 and the friction plate 23. This provides an adjustable tension for the friction plate 23 so that the clutch disc 18 may be clamped between the two friction faces 19 and 20.

Three fulcrum studs, one of which is shown at 28 at the top of Fig. 1, are secured in the base plate 21 and the friction plate 23 is apertured to fit over these studs as shown. The friction plate is provided with two lugs 29 adjacent each fulcrum stud as shown in Fig. 3, and a lever 30 is pivoted between these lugs 29 on the pin 31. The upper end of this lever engages the end of the respective fulcrum stud 28 and the lower end engages the flange 32 of the sleeve 33.

This sleeve 33 fits loosely over the geared sleeve 15, the toothed sleeve 11 and the toothed hub 9 of the clutch disc 8. A ball thrust bearing 34 is provided at the left end of the sleeve 33 and by movement of the sleeve 33 to the right of Fig. 1 the levers 30 are turned to lift the friction plate away from engagement with the clutch disc 18. When the sleeve is returned to position the springs 27 cause the ends of the levers 30 to follow the sleeve. The sleeve 33 is also provided with a collar 35 which is normally in spaced relation with the ends of the levers 36, one of which is shown in Fig. 1. This lever is pivoted in a bifurcated stud 37 and is provided with a notch engaging the end of a lever 38 which is also pivoted in the same stud. These studs are secured in the end of the clutch housing 2, as shown in Fig. 1, and the ends of the pivoted levers 38 engage beneath lugs 39 secured to the friction plate 40 which is provided with a friction face 41 normally engaging the clutch disc 8. A second friction face 46 for the clutch disc 8 is secured to the clutch housing 2. By this arrangement of levers, movement of the sleeve 33 to the right of Fig. 1 will move the collar 35 into engagement with the inner ends of the levers 36 and turns these levers on their pivots. This also turns the levers 38 on their pivots and moves the friction plate 40 away from the clutch disc 8.

To produce movement of the sleeve 33 to the right of Fig. 1 a pair of shoes 42 are provided riding against the collar 43 on the sleeve 33 as shown in Figs. 1 and 2. These shoes are connected to arms 43a which are secured to a shaft 44. This shaft 44 extends through the housing wall 2 and an arm 45, shown in dotted lines in Fig. 1, is secured to the shaft 44 exteriorly of the housing 2 and the arm 45 is connected by suitable linkage (not here shown) with the clutch pedal. As will be understood from Fig. 1 movement of the arm 45 in the direction of the arrow will move the sleeve 33 to the right of said figure to disengage both clutches in succession. It will be noted that the first movement of the sleeve 33 to the right of Fig. 1 moves the levers 30 to disengage the clutch disc 18 while further movement of the sleeve 33 moves the levers 36 to disengage the clutch disc 8.

As hereinbefore described the geared sleeve 15 is provided with gear teeth 17 on the end thereof meshing with two idler pinions 47. Each idler pinion 47 is formed integrally with an idler pinion 48 which meshes with a gear 49 formed on the shaft 6 as shown in Fig. 1. The idler pinions are mounted on shafts 50 which are supported at their outer ends in the fly wheel 4 and the base plate 21 which is secured to the fly wheel. As will be understood from Fig. 3 the pinions are arranged on diametrically opposite sides of the gear 17 on the geared sleeve 15.

With the parts in the position shown in Fig. 1 and with the flywheel 4 revolving in a counter-clockwise direction as will be understood from Figs. 1 and 3 the base plate 21 and friction plate 23 revolve with the fly wheel. As the friction faces 19 and 20 are in engagement with the clutch disc 18 at this time, the clutch disc also revolves with the fly wheel and the geared sleeve 15 travels with the clutch disc 18 as it is secured thereto. In this manner the gear 17 is secured to rotate with the flywheel thus locking the pinions 47 and 48 which mesh with the gear 49 and secure the shaft 6 to rotate with the flywheel. This is the normal operation when the clutch is fully engaged. As the geared sleeve 15 is also rotating in a counter-clockwise direction with the flywheel the shoulder 51 of the notch 14, shown in Fig. 4, engages the tongue 13 of the toothed sleeve 11 and carries the toothed sleeve in a counter-clockwise direction with the geared sleeve. Even if the toothed sleeve 11 were in engagement with the toothed hub 9; the sloping faces of the teeth would throw the toothed sleeve out of engagement with the toothed hub as the toothed hub is held stationary at this time by the friction plate 40. In fact all parts rotate at this time but the disc 8 and hub, friction plate 40 and actuating levers and the arms 43 for operating the sleeve 33.

Should the sleeve 33 be moved to the right of Fig. 1 at this time sufficiently to disengage the clutch disc 18, but not enough to release the clutch disc 8, the geared sleeve 15 immediately becomes free to rotate on the shaft 6. The load being on the shaft 6 the said shaft tends to slow up in its rotation thus rotating the pinions 48 in mesh therewith and the pinions 47 formed integrally with the pinions 48. As the pinions 47 are larger in diameter than the pinions 48 their circumferential travel is greater which thus turns the geared sleeve 15 in a clockwise direction in relation to the counter-clockwise direction of rotation of the fly wheel. This turns the cam faces 52 of the notches 14 in the geared sleeve 15 beneath the ends of the two tongues 13 on the toothed sleeve 11 thus moving the toothed sleeve to the right of Fig. 1, and moving the teeth 12 on the sleeve 11 into engagement with the teeth 10 on the hub 9 of the clutch disc 8 as will be understood from Figs. 1, 4 and 5. As the faces 53 of the notches 14 strike the tongues 13 the geared sleeve 15 and toothed sleeve 11 immediately stop rotation due to the fact that the disc 8 and hub 9 are held stationary at this time. This holds the gear 17 stationary with the clutch disc 8 and the idler pinions 47 rotate around the gear 17 and in mesh therewith. As the circumferential travel of the idler pinions 47 is greater than that of the idler pinions 48 which mesh with the gear 49 on the shaft 6 the shaft 6 will be driven at a considerably less speed than the speed of rotation of the flywheel 4 in which the shaft 6 is piloted.

By depressing the clutch pedal to also disengage the clutch disc 8 the entire clutch is disengaged. Upon letting the clutch in again the clutch disc 8 is first held stationary to drive the shaft 6 at the low gear ratio and when the clutches are fully engaged the shaft 6 is driven at the same speed as the flywheel. By this arrangement a partial depression of the clutch pedal causes the shaft 6 to be driven at a lower gear ratio so that it is usually unnecessary to use the gear shifting lever except under extreme conditions.

From the foregoing description it becomes evident that the device is extremely simple in operation, will provide different gear ratios at different positions of the clutch pedal, will not easily get out of order, and provides a device which accomplishes the objects described.

Having thus fully described my invention, its utility and mode of operation, what I claim and desire to secure by Letters Patent of the United States is—

1 In a selective ratio clutch, a housing, a flywheel rotatable in the housing, a shaft rotatable in the housing and piloted in the flywheel, a gear secured to said shaft, a second gear rotatable on the shaft, an epicyclic gear train meshing with the first named gear and provided with companion gears meshing with said second gear, a clutch secured to the flywheel, a clutch disc secured to said second gear and normally held by said clutch, a second clutch disc having a hub, a second clutch secured to the housing and normally holding said second clutch disc from rotation, a member movable longitudinally of the shaft for connecting the second gear to the hub of the second clutch disc, means actuated by release of the first clutch for moving said member to connect the second gear to the hub of the second clutch disc, and means for releasing both clutches successively.

2. In a selective ratio clutch, a housing, a flywheel mounted for rotation in the housing, a shaft rotatably mounted in the housing and piloted in the flywheel, a gear secured to said shaft, a second gear rotatable in relation to said shaft, an epicyclic gear train meshing with said first named gear, a companion gear formed integrally with each gear of said epicyclic train and meshing with said second gear, a clutch for securing said second gear to rotate with the flywheel, a second clutch secured to the housing, a clutch disc held by said second clutch, means operated upon release of the first clutch for connecting said second gear to the clutch disc of the second clutch and a separate means for releasing both clutches.

3. In a selective ratio clutch, a housing, a flywheel rotatably mounted in the housing, a shaft rotatably mounted in the housing and piloted in the flywheel, a gear secured to said shaft, a second gear rotatably mounted on said shaft, an epicyclic gear train carried by the flywheel and meshing with the first named gear, a companion gear of different ratio formed integrally with each gear of the epicyclic train and meshing with the said second gear, a clutch for securing said second gear to rotate with the flywheel, means for releasing said clutch, and a second clutch secured to the housing including a clutch disc and hub, and automatically operated means actuated by release of the first named clutch for connecting the second gear to the disc hub of the second clutch.

4. In a selective ratio clutch, a shaft, means for driving the shaft, a high speed clutch, and a low speed clutch interposed between the driving means and the shaft, means for successively releasing the said clutches, and a separate means interposed between the two clutch members whereby upon release of the high speed clutch said means is moved to a position to cause the driving shaft to rotate at a reduced speed.

In testimony whereof I sign this specification.

ALBERT E. STOKER.